United States Patent
Delaney

(10) Patent No.: US 11,793,371 B2
(45) Date of Patent: Oct. 24, 2023

(54) ENGAGEMENT APPARATUS

(71) Applicant: KASS BATHROOM PRODUCTS LIMITED, Halifax (GB)

(72) Inventor: Paul Delaney, Leeds (GB)

(73) Assignee: KASS BATHROOM PRODUCTS LIMITED, Hailfax (GB)

( * ) Notice: Subject to any disclaimer, the term of this patent is extended or adjusted under 35 U.S.C. 154(b) by 945 days.

(21) Appl. No.: 16/630,240

(22) PCT Filed: Jul. 11, 2018

(86) PCT No.: PCT/GB2018/051973
§ 371 (c)(1),
(2) Date: Jan. 10, 2020

(87) PCT Pub. No.: WO2019/012277
PCT Pub. Date: Jan. 17, 2019

(65) Prior Publication Data
US 2021/0361130 A1    Nov. 25, 2021

(30) Foreign Application Priority Data
Jul. 11, 2017 (GB) .................................. 1711143
Jul. 13, 2017 (GB) .................................. 1711256
(Continued)

(51) Int. Cl.
*A47K 13/26* (2006.01)
*F16B 2/04* (2006.01)
(Continued)

(52) U.S. Cl.
CPC ............... *A47K 13/26* (2013.01); *F16B 2/04* (2013.01); *F16B 2/185* (2013.01); *F16B 13/0808* (2013.01); *F16B 13/0841* (2013.01)

(58) Field of Classification Search
CPC ...................................................... A47K 13/26
(Continued)

(56) References Cited

U.S. PATENT DOCUMENTS

2018/0042434 A1* 2/2018 Fielding, Jr. ........... A47K 13/10

FOREIGN PATENT DOCUMENTS

| DE | 29804519 U1 | 6/1998 |
|---|---|---|
| DE | 202015103074 U1 | 7/2015 |

(Continued)

OTHER PUBLICATIONS

Google English translation of DE 20 2015 103074 U1 printed Dec. 27, 2022 (Year: 2022).*

(Continued)

*Primary Examiner* — Christine J Skubinna
(74) *Attorney, Agent, or Firm* — Renner, Otto, Boisselle & Sklar, LLP

(57) ABSTRACT

A retaining pin having a body section with an aperture therein and an actuation mechanism arranged at a first end of the body section. A pin is provided and connected at a first end to the actuation means and extending therefrom, through the aperture of the body section. An outer sleeve is arranged around the pin in contact therewith and the outer sleeve comprises an expandable section that, upon operation of the actuation means, can be expanded from a first dimension to a second dimension, wherein the second dimension is greater than the first.

8 Claims, 12 Drawing Sheets

(30) Foreign Application Priority Data

Oct. 30, 2017 (GB) ...................................... 1717782
Feb. 1, 2018 (GB) ...................................... 1801654

(51) Int. Cl.
*F16B 2/18* (2006.01)
*F16B 13/08* (2006.01)

(58) Field of Classification Search
USPC ............................................................ 4/237
See application file for complete search history.

(56) References Cited

FOREIGN PATENT DOCUMENTS

| | | | |
|---|---|---|---|
| EP | 0480534 A1 | 4/1992 | |
| GB | 774002 A | 5/1957 | |
| WO | 2016001371 A1 | 1/2016 | |

OTHER PUBLICATIONS

International Search Report and Written Opinion dated Oct. 17, 2018 issued in PCT/GB2018/051973.

* cited by examiner

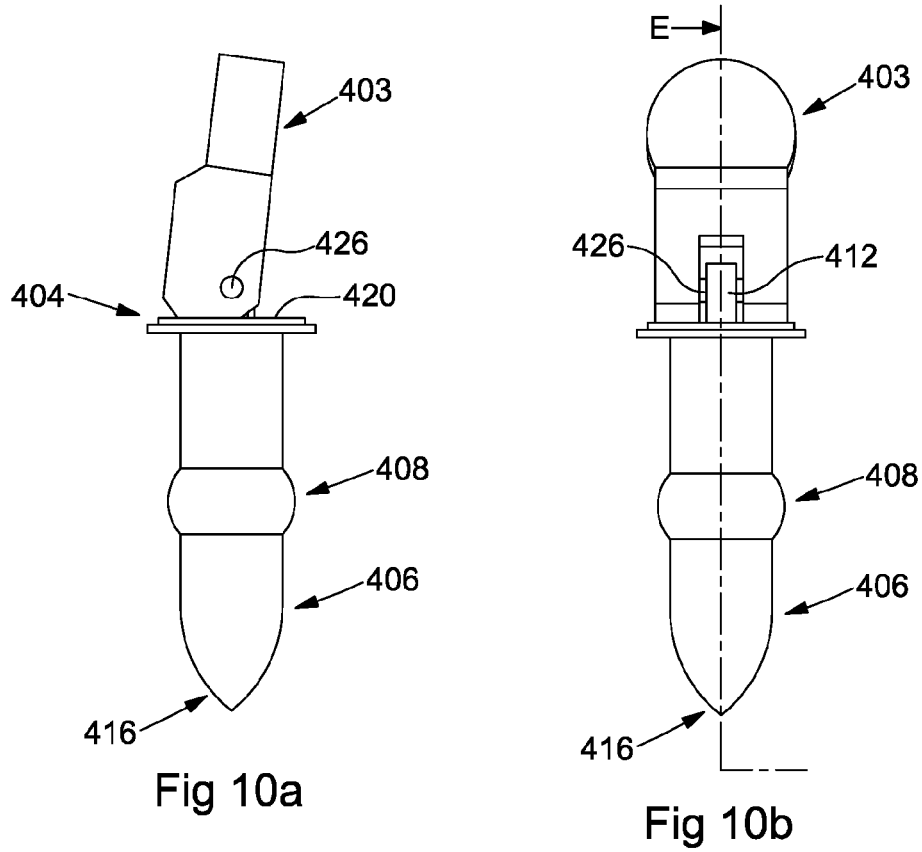
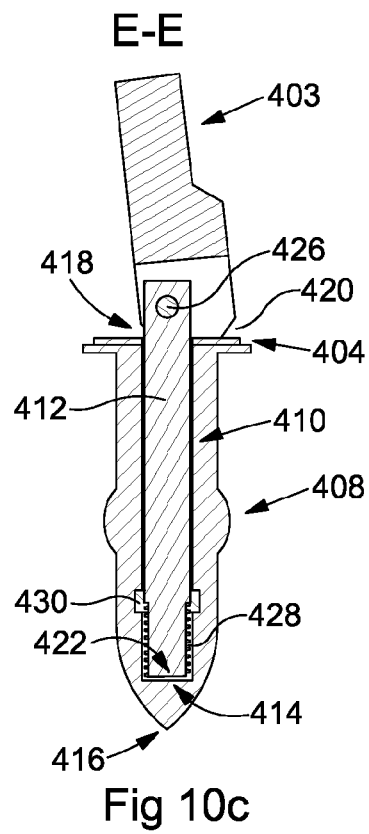
Fig 10a
Fig 10b
Fig 10c

ENGAGEMENT APPARATUS

RELATED APPLICATIONS

This application is a national phase entry of International Application No. PCT/GB2018/051973 filed on Jul. 11, 2018 and published in the English language, which claims priority to GB Application No. 1711143.6 filed Jul. 11, 2017, GB Application No. 1711256.6 filed Jul. 13, 2017, GB Application No. 1717782.5 filed Oct. 30, 2017, and GB Application No. 1801654.3 filed Feb. 1, 2018, all of which are hereby incorporated by reference.

This invention relates to engagement apparatus in the form of a retaining pin and to a method of use thereof, the engagement apparatus being for the connection of two or more items, particularly for connecting a toilet seat to a toilet pan.

Conventionally, a toilet seat and/or lid is attached to a toilet pan or bowl via bolts that are located through apertures in the toilet seat and through pre-defined apertures in the toilet pan. The bolts are inserted from an upper surface of the toilet pan and are secured in place using nuts connected from underneath the toilet pan; however, it is often difficult to gain access to the underside of the toilet pan because there is normally restricted access around and underneath the toilet pan. Additionally, the fitting process can require special tools to fit the nuts onto the bolts and so, once fitted, the toilet seat generally remains in place for the duration of use of the toilet pan or is at least seldom replaced. This creates a potential hygiene issue because the nut and bolt arrangement can be difficult to keep clean and disconnecting and refitting the seat can be a time-consuming process. Furthermore, it has been found that conventional fittings can become loose over time and have to be frequently tightened.

It should also be noted that the apertures in the toilet pan through which the bolts are placed to attach a toilet seat are often of different depths and/or diameters. This results in a situation where standard bolts are used that are not sized appropriately or forces between the two bolts cause an imbalance of forces acting on the toilets seat that can cause problems.

According to a first aspect of the present invention there is provided retaining pin comprising:
  a body section having an aperture therein;
  an actuation mechanism arranged at a first end of the body section;
  a pin, connected at a first end to the actuation means and extending therefrom, through the aperture of the body section; and
  an outer sleeve arranged around the pin and in contact therewith;
  wherein the outer sleeve comprises an expandable section that, upon operation of the actuation means, can be expanded from a first dimension to a second dimension.

In one arrangement, the outer sleeve is arranged substantially coaxially with the pin and the body section. This allows the parts to be readily aligned and to operate along substantially the same axis. As the actuation mechanism is arranged at one end of the pin and the sleeve is connected to the same pin, operation of the actuation mechanism to adjust the axial position of the pin, relative to the body section, changes the axial position of at least part of the sleeve in the same direction. The axial movement of the pin adjusts compression forces on the expandable section of the sleeve, thereby allowing the expandable portion to move between the relatively expanded condition and the relatively retracted condition.

It is particularly advantageous that the second dimension of the outer sleeve is greater than the first. This locks the retaining pin in place relative to an aperture through which the pin passes.

It is preferable that the body section comprises a threaded section on its external surface. The body section can engage the item to which it is being connected and/or the sleeve, depending upon the arrangement and the parts to be connected. The threads allow the position of the body section within the item to be adjusted within an aperture and/or for the position of the sleeve to be adjusted, relative to the body section and actuation mechanism.

Advantageously, the pin comprises an external threaded section along at least part of its length and the outer sleeve comprises a corresponding thread to engage the threaded section on the pin. Retaining the sleeve on the end of the pin allows the actuation mechanism to compress the expandable section of the sleeve, when operated In one embodiment, the outer sleeve comprises a plurality of sections. The use of a plurality of sections allows for adjustment of parts of the device that can be undertaken independently of other parts of the sleeve, and preferably, the sleeve comprises:
  a first section that engages the body section;
  a second section comprising an expandable material; and
  a third section that engages the pin;
  wherein actuation of the actuation mechanism moves the third section axially towards the body section to compress the second section, thereby causing it to expand radially and, more preferably, the position of the first section on the body section is axially adjustable to vary the distance between the first section and the actuating mechanism.

Where the sleeve comprises sections, it is advantageous that the position of the third section is axially adjustable on the pin to vary the distance between the third section and the actuation mechanism.

The first section can be moved axially along the body section to adjust the distance between the actuation mechanism and the second section. This allows the pin to be used for fitting items to surfaces with different depths, for example, toilet pan biscuits with depths that might vary significantly. The third section can be moved axially along the pin to adjust the amount of compression applied to the expandable material, thereby adjusting the width of the compressed section, which allows the device to compensate for various diameters through which it may pass, again, for example, in toilet pans where the aperture diameter may vary from 13 mm to 18 mm. The first and third sections may be considered to be limiting mechanisms that are located on both sides of the expandable section. This limiting means then ensures correct expansion and retraction of the expandable section. Preferably, first and third sections of the sleeve may comprise one or more of: nuts; sleeve members; ferrules washer members; and inserts.

In an alternative arrangement, the outer sleeve is integral with the body section. This provides a device that is simple to manufacture and operate and is particularly useful where the depth of an aperture into which the device is intended to be inserted does not vary, thereby allowing the expandable section to be positioned at a set distance from the actuation mechanism.

It may be that the expandable section comprises an elastomeric material or a rubber material that expands radially when compressed. Other materials may also be suitable for compression in such a manner that they materials provide a predictable radial expansion upon axial compression. For example, expandable, flexible and/or resiliently deformable material, such as rubber, neoprene, latex, silicone and/or plastics material.

It is preferred that the actuation mechanism comprises a cam to move the end of the pin distal from the actuation mechanism axially within the body section, thereby compressing the expandable material. The use of a cam provides a simple mechanism for actuating the device, whilst being easy for a user to operate.

In the present invention, the retaining pin may be biased into having the expandable section in an expanded or contracted position. Thus, in one arrangement, the user may operate the actuation mechanism to narrow the sleeve thereby allowing the pin to be inserted, before the biasing expands the sleeve. Alternatively, user actuation may expand the sleeve from the contracted position so that the pin is inserted in its rest state and then expands when in place. Where the pin is biased to the contracted state, the actuation mechanism may require a locking element to keep the actuation means activated and the sleeve in the expanded state, which may be in the form of a cam.

The present invention extends to a toilet seat arrangement comprising a toilet seat having a body portion and a retaining pin as set out herein, the retaining pin being connected to the toilet seat. Thus, the present invention may relate to a toilet seat that is provided with a retaining pin for attaching the toilet seat to a toilet pan.

Preferably, an aperture in the body portion of the toilet seat comprises a threaded inner surface and the body section of the retaining pin comprises corresponding threaded section and the respective threaded sections engage. This allows adjustment of the position of the retaining pin, relative to the body portion of the toilet seat.

The present invention further extends to a toilet seat and toilet pan fixing arrangement and a method of installing the same, wherein a toilet seat as set out herein is provided and a toilet pan is provided that has a biscuit with at least one aperture therein, wherein the retaining pin passes through the at least one aperture in the toilet pan biscuit and, when the actuation mechanism is operated, the expandable section expands to a size larger than the aperture in the toilet pan biscuit, thereby retaining the seat on the pan.

Thus, the retaining pin may be detachable engagement means arranged to move between an engaged position, wherein at least a part of the engagement means is in a relatively expanded or extended condition to allow engagement of the engagement means to an item, and a disengaged position, wherein the at least said part of the engagement means is in a relatively retracted or recessed condition to allow disengagement, insertion and/or removal of the engagement means with respect to the item.

Although the concept of expandable engagement apparatus is known, such as for example the use of expandable wall anchors or butterfly clips for plasterboard, these types of devices are designed to be one-way fixings that do not retract or disengage once they have been expanded. Where they can be retracted, they require special tools to move between the retracted position and the expanded position. Thus, the prior art apparatus is often difficult to remove once inserted and is often not reusable. Additionally, these types of prior art devices are not employed, nor are they suitable, for fixing toilet seats to toilet pans. The retaining pin, or engagement apparatus, of the present invention can be moved between the engaged position and the disengaged position as often as required, thereby allowing the connected items to be readily detached. Furthermore, the present invention provides a quick-release mechanism that can be operated quickly and easily and requires no special tools to move the same between the engaged and disengaged positions.

Since the apparatus of the present invention can be removed and/or reused, it allows removal of the retaining pin or disengagement of the parts for cleaning purposes and for readjustment purposes with relative ease. In particular, in some embodiments of the present invention, the entire engagement apparatus can be removed as a single unit. The retaining pin, or engagement apparatus, of the present invention can be fitted and/or removed from a single side of the items being connected, thereby removing the need to have access from both sides of the items or apparatus.

The actuation mechanism allows for actuation or movement of the retaining pin between the engaged position and the disengaged position in use, and the actuation mechanism may include one or more of a button, a lever, a switch, a handle, and a dial. Furthermore, a single actuation mechanism may control a single retaining pin or a plurality thereof. Where a plurality of pins is controlled by a single actuation mechanism the pins may be actuated simultaneously, separately of one another. The actuation mechanism may be slidably movable, rotatably movable and/or pivotably movable. The actuation mechanism may be resiliently biased to the locked position and the bias may comprise springs or resiliently yieldable material.

In one embodiment the at least part of the retaining pin, or engagement means, is movable between the relatively expanded or extended position and the relatively retracted or recessed position is as a result of movement of one or more mechanical parts, mechanical and/or physical movement of the at least part of the engagement means moving relative to another part and/or the like.

Preferably, the retaining pin further comprises a radially-extending flange. The body section may have a neck portion, at least part of which is inserted through an aperture with which the apparatus is to be engaged.

When inserted into an aperture in a receiving item, the expandable section is located on the side of the item distal from that of the actuation mechanism. Thus, the actuation mechanism is on one side of the item and the expandable section is on the opposite side thereof.

Advantageously, the at least part of the sleeve movable between the expanded or extended position and the retracted or recessed position is resiliently biased to the retracted or recessed position. As such, once the apparatus is moved from the engaged position to the disengaged position, the part of the engagement means automatically moves to the retracted or recessed position in use.

Preferably, the body section is provided with a screw thread on at least a part of an external surface thereof so that the sleeve, or part thereof, such as a nut, having an internal screw thread may be rotatably, or threadedly, mounted on the body section and movable relative thereto.

In one arrangement, a nut or threaded object is provided within the sleeve with which the pin engages. As such, subsequent movement of the pin, typically by linear axial movement relative to the body section, causes the nut or threaded object to also move, thereby causing the nut or threaded object to compress sleeve or bushing, which causes relative radial expansion of at least part of the sleeve to move the same to the engaged position.

In one embodiment, rotation of the support member and/or actuation means relative to the nut or threaded object causes the position of the nut or threaded object along the pin to change/move, which allows adjustment of the size or width of the expansion portion of the sleeve. As such, the engagement means of the present invention can be adjusted to fit different depth or diameter/width apertures.

Thus, the present invention provides engagement apparatus or a retaining pin that is arranged to allow adjustment of the same to fit different height/depth and/or different widths of apertures. Similarly, a method of using the engagement apparatus or retaining pin to allow adjustment of the same to fit different height/depth and/or different widths of apertures is discussed herein.

BRIEF DESCRIPTION OF THE DRAWINGS

Embodiments of the present invention will now be described with reference to the following figures, wherein;

FIGS. 10a-10c show a side view, a front view, and a cross sectional view taken along line C-C of FIG. 10b of the engagement apparatus in FIGS. 8a-8c following adjustment of the expandable portion according to an embodiment of the present invention;

FIG. 11a shows a front view of the engagement apparatus in a start and disengaged position on a toilet bowl in use;

FIG. 11b shows a cross sectional view taken along line B-B of FIG. 11a;

FIG. 11c shows a cross sectional view taken along line A-A of FIG. 11a; and

FIG. 11d is a partial perspective view of FIG. 11a;

FIG. 12d is an enlarged view of the circular section in FIG. 12a;

DETAILED DESCRIPTION OF THE FIGURES

Figure 1A:
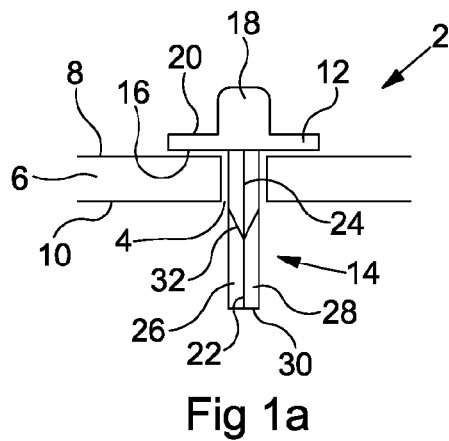
FIGS. 1a and 1b show engagement apparatus according to an embodiment of the present invention is a disengaged position and an engaged position respectively.
Figure 1B:
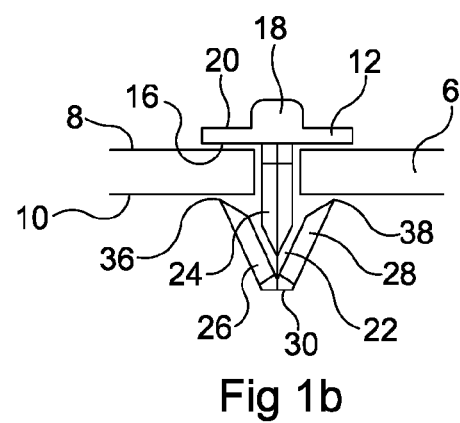

Referring firstly to FIGS. 1a and 1b, there is illustrated a retaining pin, or engagement apparatus, 2 suitable for engaging a toilet seat/lid to a toilet pan. The engagement apparatus 2 can be moved between disengaged and engaged positions with respect to an aperture 4 defined in the toilet pan 6 through which at least part of the apparatus 2 in inserted.

The toilet pan 6 has an upper surface 8 and a lower surface 10 and the aperture 4 is defined between the upper surface 8 and lower surface 10.

The engagement apparatus 2 includes a body section 12, having an extension 14 extending from a first or lower side 16 of body section 12, and a user actuation mechanism in the form of a button 18 provided on a second or upper surface 20 of body section 12.

In use, the extension 14 is inserted through aperture 4 from an upper surface 8 of toilet pan 6 such that the lower side 16 of body section 12 rests on the upper surface 8 of toilet pan 6. The body section 12 has a greater width than the width of aperture 4 such that the body section 12 is prevented from moving through aperture 4, when in place.

The extension 14 has a central support 22 and a piston rod 24 mounted around said central support 22 and movable relative thereto at an upper part of the extension 14. A sleeve in the form of two movable members 26, 28 are pivotably mounted to an end 30 of central support 22 at a lower part of the extension 14. The lower part of the extension portion 14 is the part furthest from the actuation mechanism 18. The upper part of the extension 14 is the part nearest to the actuation mechanism 18. The two movable members 26, 28 are resiliently biased to a retracted position, as shown in FIG. 1a.

Movement of the button 18 between a non-actuated position, as shown in FIG. 1a and an actuated position, as shown in FIG. 1b, as a result of a user applying a force on button 18 towards the toilet pan 6, slidably moves the piston rod 24 from a raised position as shown in FIG. 1a to a lowered position, as shown in FIG. 1b.

With the piston rod 24 in a relatively raised position, the end 32 of piston rod 24 is relatively close to body section 12 and aperture 4. With the piston rod 24 in a relatively lowered position, the end 32 of piston rod 24 is relatively far away from body section 12 and aperture 4.

Movement of the piston rod 24 from the raised position to the lowered position, moves end 32 of piston rod 24 against the ends 36, 38 of movable members 26, 28, thereby causing pivotal movement of the ends 36, 38 of movable members 26, 28 from the retracted position in FIG. 1a, to an outwardly protruding or expanded position, as shown in FIG. 1b. With the movable members 26, 28 in the retracted position, the width of the lower part of the extension 14 is less than the width of aperture 4, thereby allowing the extension 14 to be inserted through and be removable from aperture 4. With the movable members 26, 28 of the sleeve in the outwardly protruding position, the width of the lower part of the extension 14, the sleeve, is greater than the width of aperture 4, thereby preventing the retaining pin 2 from being withdrawn/removed from aperture 4.

The movable members 26, 28 of the sleeve are resiliently biased to the retracted position such that once the piston rod 24 returns to the raised position, the movable members 26, 28 automatically return to the retracted position. The piston rod 24 typically remains in the raised or lowered position until a user specifically moves the button 18 from the non-actuated position to the actuated position, or vice-versa.

The end 32 of piston rod 24 has a narrowing taper away from body portion 12, and end 32 engages with inwardly sloped surfaces 36, 38 at the ends of movable members 26, 28 closest to piston rod 24. This enables the piston rod 24 to pivot the ends 36, 38 of movable members 26, 28 in an outwardly direction as it moves towards the movable members 26, 28.

Figure 2A:
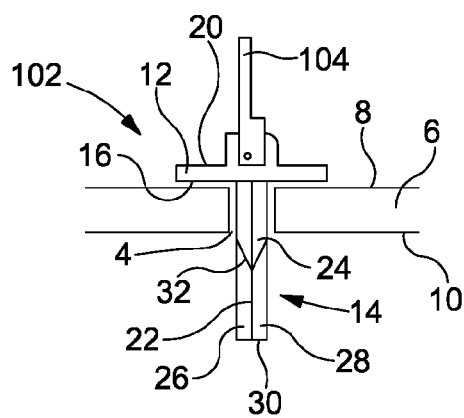
FIGS. 2a and 2b show engagement apparatus according to an embodiment of the present invention in a disengaged position and an engaged position respectively.
Figure 2B:
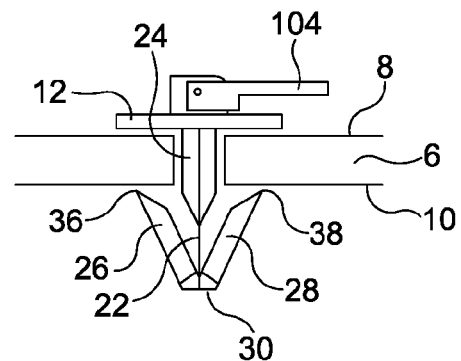

A further embodiment of engagement apparatus 102 is shown in FIGS. 2a and 2b. This arrangement is similar to the apparatus 2 shown in FIGS. 1a and 1b with the actuation mechanism, button 18, replaced with pivotable lever 104. The lever 104 is movable from a non-actuated position, as shown in FIG. 2a, wherein the lever 104 is an upright position and is parallel or substantially parallel to neck portion 14; to an actuated position, as shown in FIG. 2b, wherein the lever 104 is moved through 90 degrees and is transverse or perpendicular to neck portion 14. Actuation of lever 104 between the non-actuated and actuated positions moves the piston rod 24 in a similar manner to that previously described.

Figure 3A:
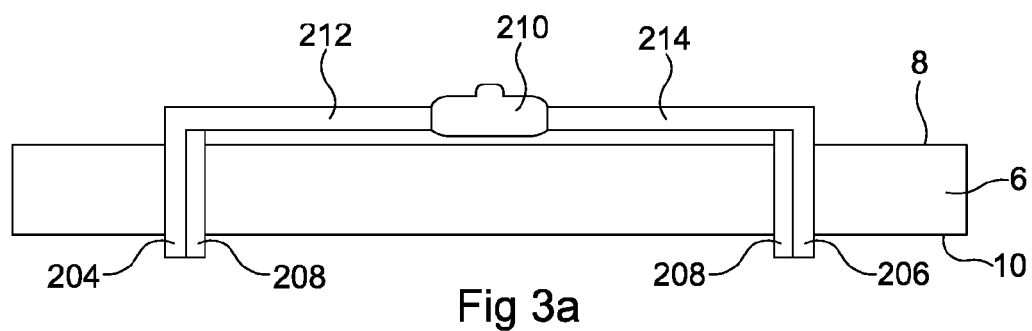
FIGS. 3a and 3b show engagement apparatus according to an embodiment of the present invention in a disengaged position and an engaged position respectively.
Figure 3B:
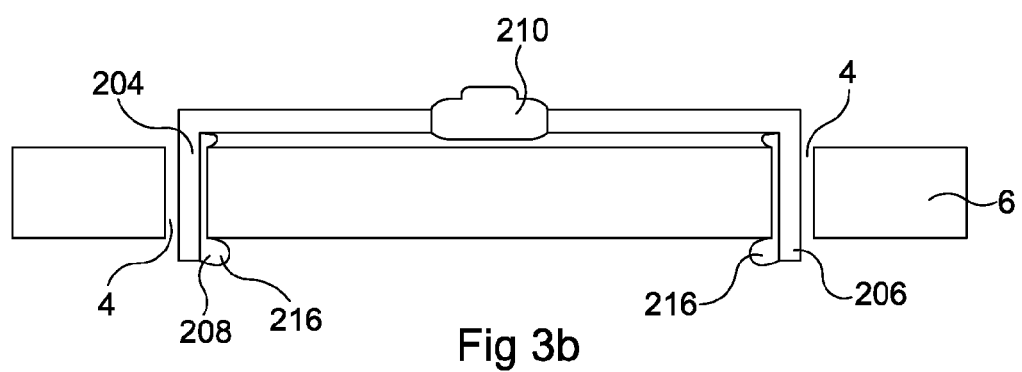
Figure 4A:
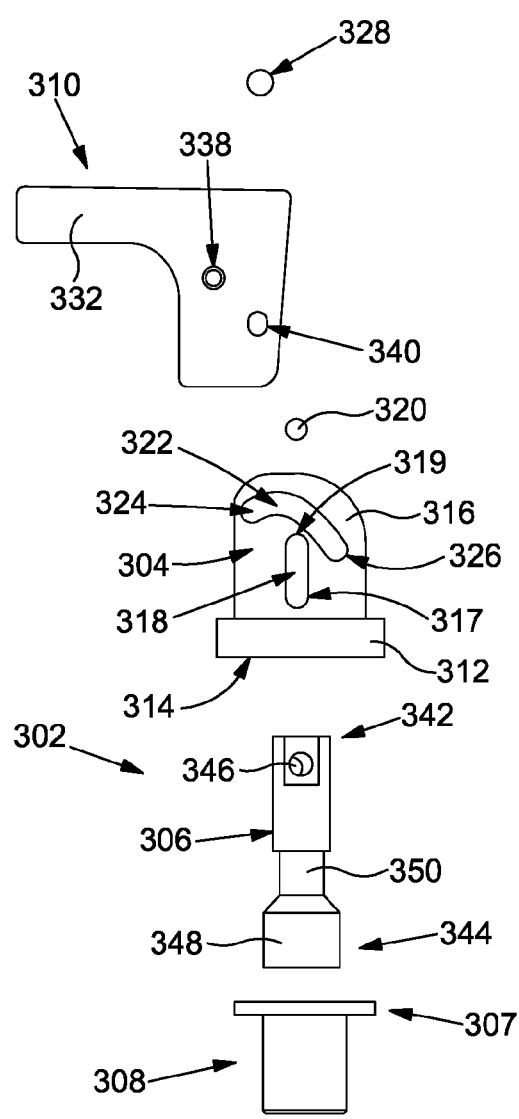
FIGS. 4a and 4b show a side view and a front view in exploded form of engagement apparatus according to a further embodiment of the present invention.
Figure 4B:
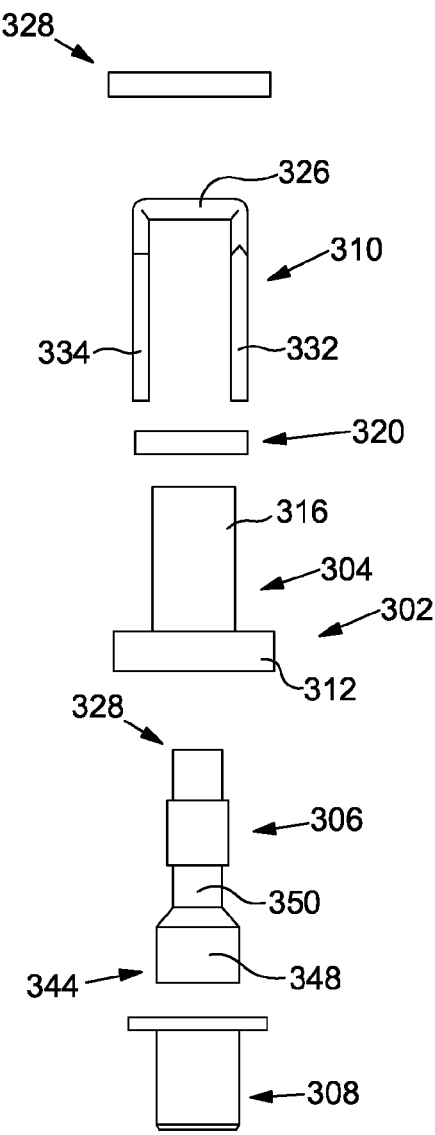

An engagement apparatus 202 is provided whereby two engagement means are actuated by a single actuation member, is shown in FIGS. 3a and 3b.

The engagement apparatus 202 includes two engagement means in the form of two clamping members 204, 206. Engagement means also includes a compressible member 208 joined to a surface of each clamping member 204, 206 which is closest to the opposing clamping member. User actuation means in the form of a rotatable dial 210 is joined to the clamping members 204, 206 via arm members 212, 214 respectively. Dial 210 can be moved between a non-actuated position, as shown in FIG. 3a, wherein the arm members 212, 214 are in a relatively extended position and clamping members 204, 206 are a relatively large spaced distance apart from each other/extended position. In this position the compressible members 208 are in a relatively uncompressed or retracted position; and an actuated position, as shown in FIG. 3b, wherein the arm members 212, 214 are in relatively retracted position and clamping members 204, 206 are moved towards each other to a relatively smaller spaced distance apart or retracted position. In this position the compressible members 208 are clamped against a side of aperture 4, thereby causing the free ends 216 of compressible members 208 to move from a retracted position to an expanded position. This expanded position prevents the compressible members 208 and clamping members 204, 206 from being removed from aperture 4 in use.

Figure 5A:
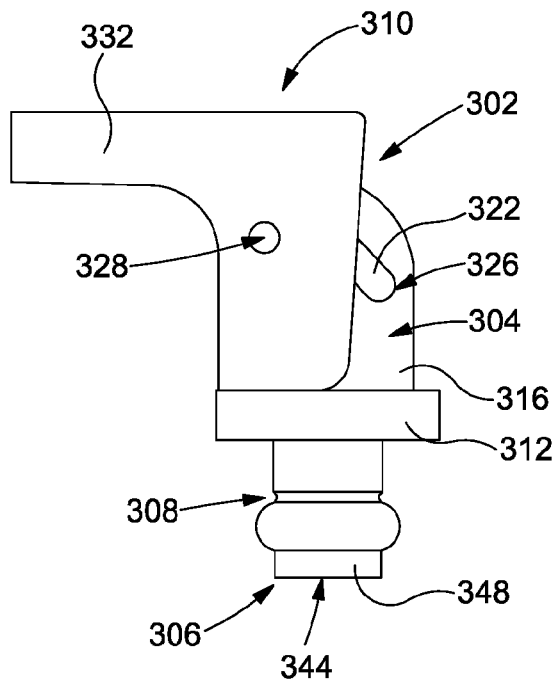
FIGS. 5a and 5b show a side view and perspective view of the engagement apparatus in FIGS. 4a and 4b in an assembled form in an engaged position respectively.
Figure 5B:
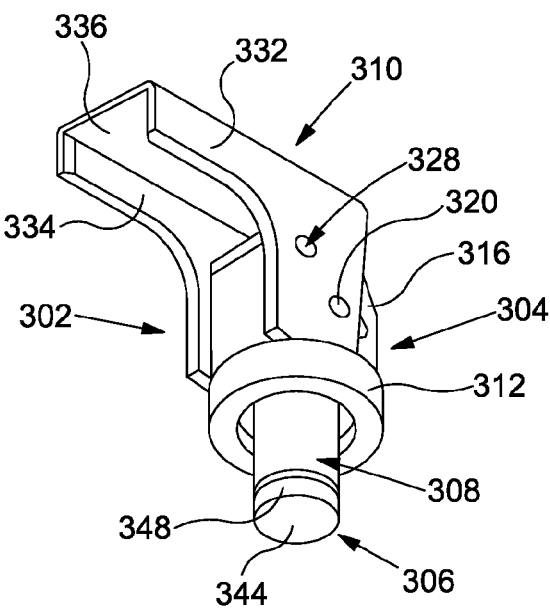
Figure 6:
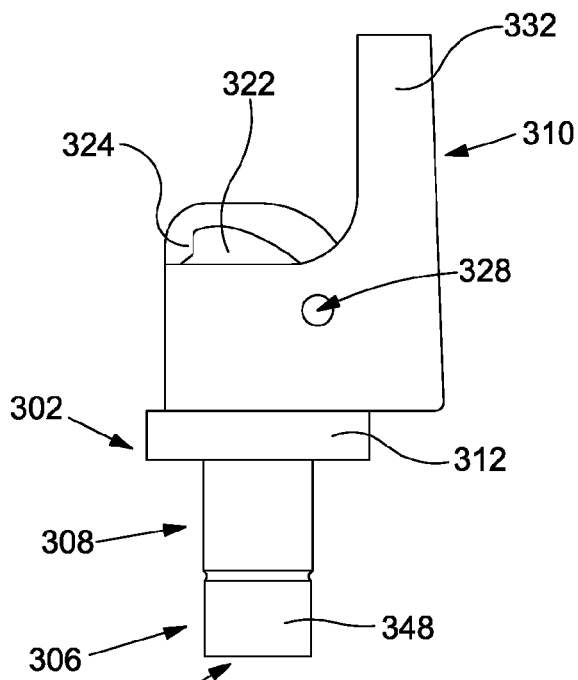
FIG. 6 shows a side view of the engagement apparatus in FIGS. 5a and 5b in a disengaged position.
Figure 7:
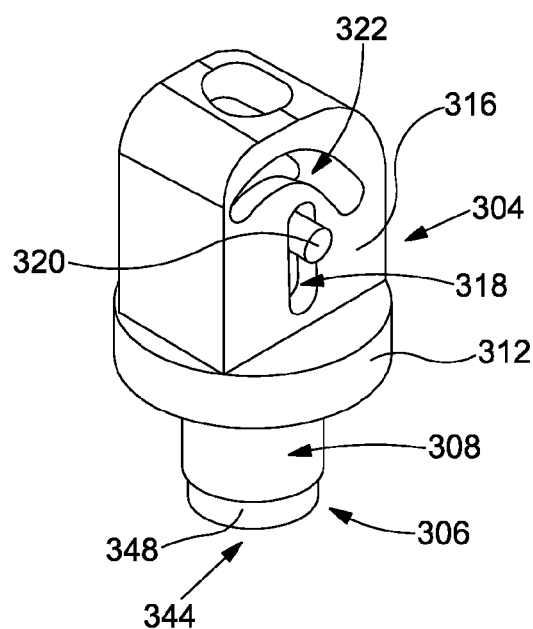
FIG. 7 show part of the engagement apparatus in FIG. 6 without the handle mechanism shown.

A further embodiment of the present invention is described with respect to FIG. 4a-7. In this embodiment, engagement apparatus 302 is movable from an engaged position, as shown in FIG. 5a, to a disengaged position, as shown in FIG. 6.

The retaining pin, or engagement apparatus, 302 includes a body section 304, a pin, or pull member, 306, a flexible sleeve member 308 and user actuation means in the form of a pivotably mounted lever 310.

The body section 304 has a base part 312, a lower surface 314 of which engages with a surface on which the retaining pin 302 is to be used, and an upper part 316. A first upright slot 318 is defined in the upper part 316 for the location of pivot pin 320 therein and for allowing slidable movement of pivot pin 320 in slot 318. A longitudinal axis of the upright slot 318 is parallel to a longitudinal axis of the pin 306. The slot 318 has a first end 317 and a second end 319. First end 317 is nearest to base part 312 and second end 318 is furthest from base part 312.

A second curved slot 322 is provided above first upright slot 318 and has a concave curvature facing towards base part 312. The slot 322 has a first end 324 and a second end 326. The first end of slot 322 is further away from base part 312 than second end 326 of slot 322. A track pin 328 is provided for slidable movement within slot 322.

Lever 310 includes a body portion which is substantially U-shaped in form having two arm members 332 and 334 with a bridging member 336 therebetween. Two apertures 338, 340 are located in arm members 332, 334 for the location of pin member 328 and pin 320 therebetween.

Pin 306 has a first end 342 and a second end 344. An aperture 346 is defined adjacent first end 342 for the location of pivot pin 320 therethrough. When assembled, first end 342 of pin 306 is located in a cavity defined in body section 304 such that aperture 346 of pin 306 is adjacent upright slot 318. Thus, movement of pivot pin 320 in slot 318 causes movement of pin 306 relative to body portion 304.

The part 348 of pin 306 immediately adjacent second end 344 has a greater width than a narrower part 350 set back from second end 344.

The flexible sleeve member 308 is movable between an expanded and engaged position, as shown in FIG. 5a, to a retracted and disengaged position, as shown in FIG. 6. A first end 307 of sleeve member 308 is typically engaged within base part 312 in use via a complementary threaded screw arrangement or via some other means.

The second end 344 of pin 306 is located through a channel through flexible sleeve member 308 when assembled, such that in the disengaged position, the wider part 348 protrudes outwardly of sleeve member 308 and the narrower part 350 is located in the channel of the sleeve member 308.

With the retaining pin 302 in the disengaged position, track pin 328 is located in the second end 326 of slot 322, the lever 332 is in an upright position where the longitudinal axis of members 332, 334 is parallel to the longitudinal axis of the pin 306, pivot pin 320 is located at second end 319 of slot 318, the wider part 348 of pin 306 protrudes outwardly from sleeve member 308 and sleeve member 308 is in a relatively retracted position, as shown in FIG. 6.

With the engagement apparatus 302 is the engaged position, track pin 328 is moved to the first end 324 of slot 322, the lever 332 is moved through 90 degrees to a transverse position where it is perpendicular to the longitudinal axis of the pin 306, pivot pin 320 is located at first end 317 of slot 318, the wider part 348 of pin 306 is pulled into the channel of the sleeve member 308, thereby causing sleeve member 308 to expand outwardly to a relatively expanded position, as shown in FIG. 5a. This expanded position allows the apparatus 302 to be retained in an aperture or through an aperture as the expanded sleeve member 308 is too wide to pass through the aperture.

The abovementioned mechanism could be employed in combination with a suction cup adjacent the body section to allow the device to be more securely fastened in place.

FIGS. 8a-9c show a further embodiment of the present invention wherein retaining pin 402 is provided with user actuation means in the form of a lever 403 to actuate or allow movement of the engagement means between the relatively expanded or first engaged position and the relatively retracted or second engaged position.

The retaining pin, or engagement apparatus, 402 comprises a head or body section 404 in the form of a plate member, and a sleeve 406 protruding perpendicular to the body section 404 and extending outwardly therefrom. The sleeve 406 has an expandable portion 408 defined part way along its length that is capable of moving between the relatively expanded condition, forming an engaged position, and the relatively contracted condition forming a disengaged position.

An elongate cavity 410 is defined through sleeve 406 and body section 404 for the location of a pin 412 therethrough. The pin 412 is an elongate linear member. A first end 414 of cavity 410 is a closed end and is provided adjacent first end 416 of sleeve 406 furthest from the body section 404. A second end 418 of cavity 410 has an opening on a top surface 420 of head section 404.

A first end 422 of the pin 412 is located adjacent first end 414 of cavity 410 and a second end 424 of the pin 412 protrudes outwardly of the second end 418 of cavity 410. Lever 403 is pivotably mounted to second end 424 of the support member 412 via a pivot pin 426. The pivot pin 426 is perpendicular to the longitudinal axis of the sleeve 406 and parallel to the top surface 420 of the body section 404.

Figure 8A:
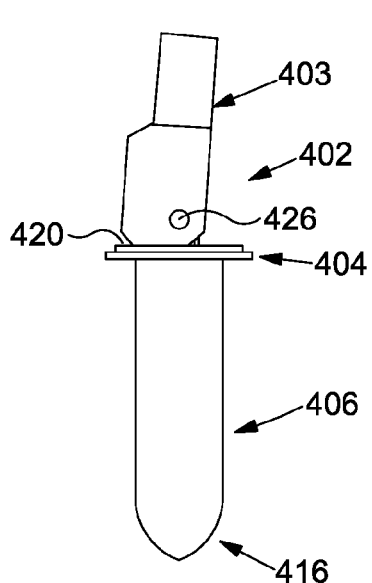
FIGS. 8a-8c show a side view, a front view, and a cross sectional view taken along line A-A of FIG. 8b, of engagement apparatus with user actuation means in a disengaged condition respectively according to an embodiment of the present invention.
Figure 8B:
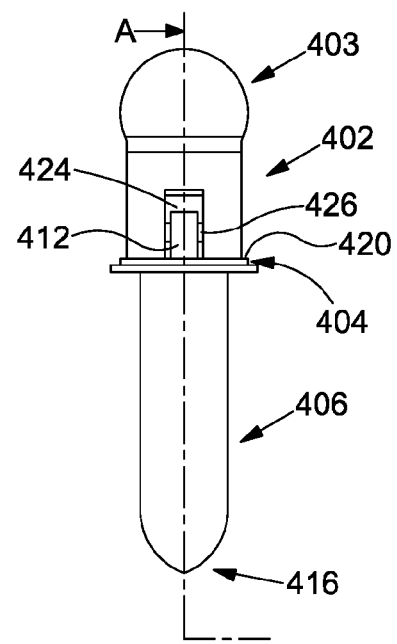
Figure 8C:
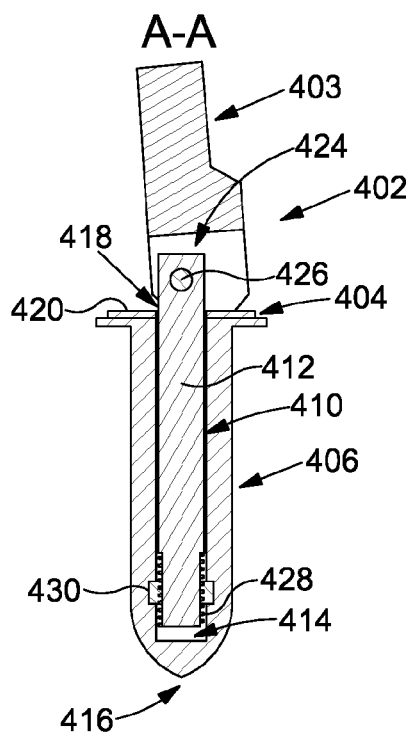

Lever 403 is pivotably movable by a user relative to the support member 412 from the first disengaged position, shown in FIGS. 8a-8c, wherein the lever 403 is in a relatively upright position and a longitudinal axis of the lever is parallel or substantially parallel to the longitudinal axis of the sleeve 406, to the second disengaged position, shown in FIGS. 9a-9e, wherein the lever 403 has been moved through approximately 90 degrees to a relatively lowered position and a longitudinal axis of the lever is perpendicular or substantially perpendicular to the longitudinal axis of the sleeve 406.

Movement of the lever 403 from the first disengaged position to the second engaged position slidably moves the pin 412 within the cavity 410 between a relatively lowered position, wherein first end 422 of pin 412 is relatively close to first end 414 of cavity 410, to a relatively raised position, wherein first end 422 of pin 412 is moved away from first end 414 of cavity 410.

At least a portion of the pin 412 adjacent first end 422 is provided with a screw thread 428 on an external surface thereof. This allows rotatable engagement with an object in the form of a nut 430 having a screw thread on an inner surface of the same, as will be described in more detail below.

Figure 9A:
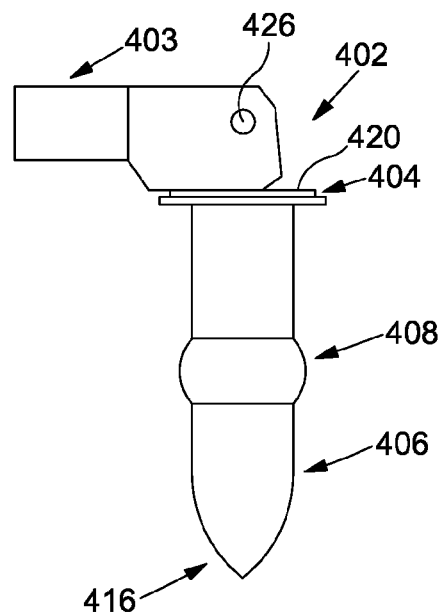
FIGS. 9a-9c show a side view, a front view, and a cross sectional view taken along line B-B of FIG. 9b of the engagement apparatus in FIGS. 8a-8c in an engaged condition respectively.
Figure 9B:
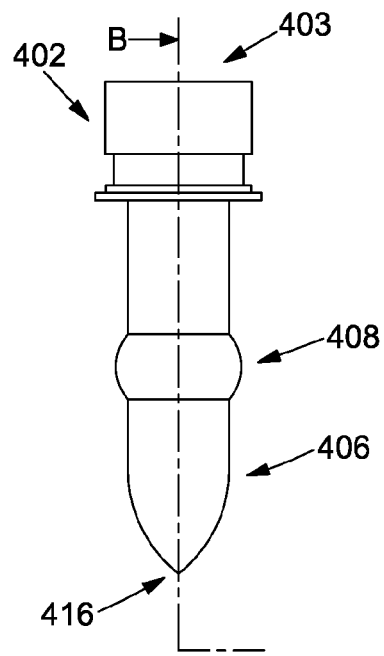
Figure 9C:
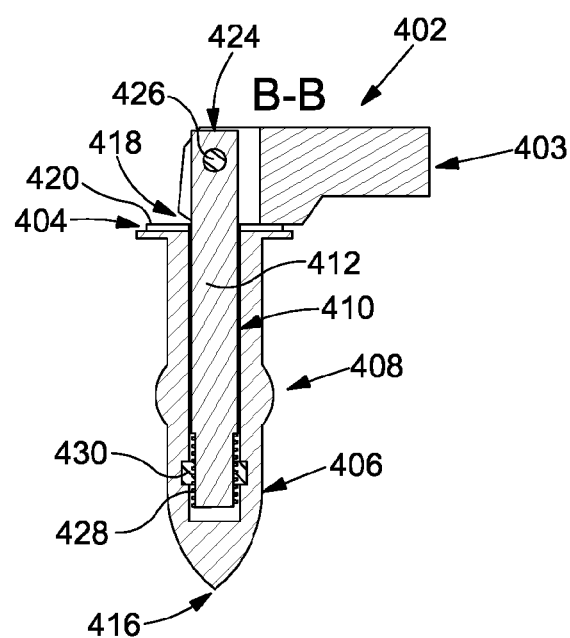
Figure 11A:
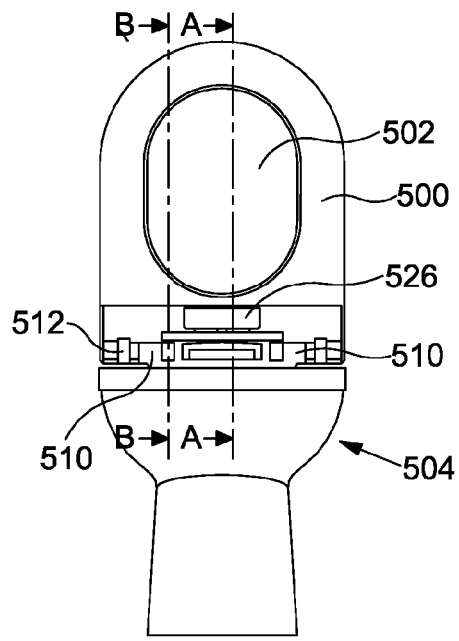
FIGS. 11a-11d show an embodiment of the engagement apparatus wherein the actuation means for moving the engagement apparatus between the engaged and disengaged positions is the toilet seat and a locking mechanism is provided.
Figure 11B:
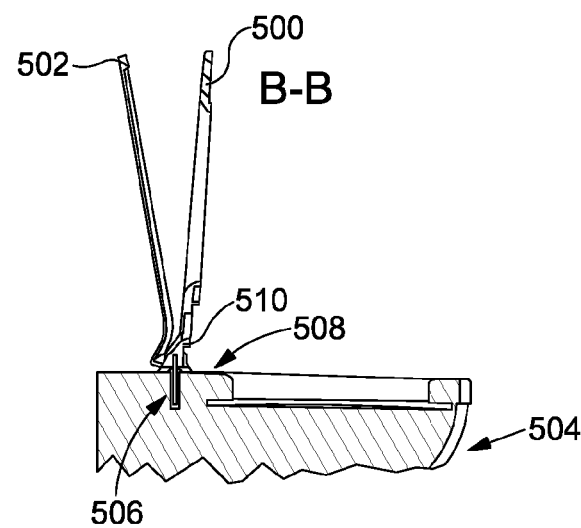
Figure 11C:
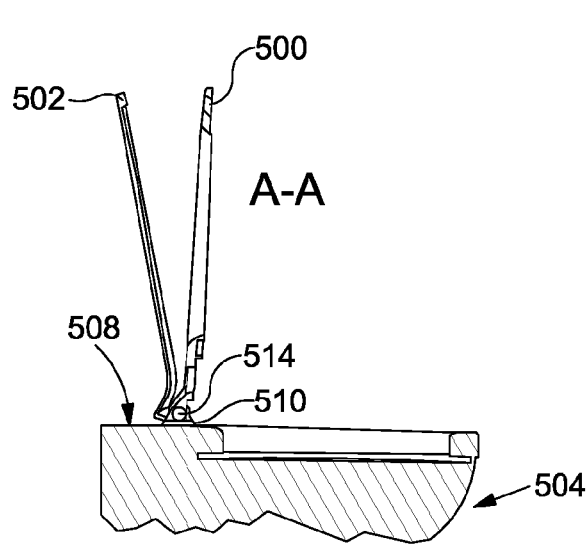
Figure 11D:
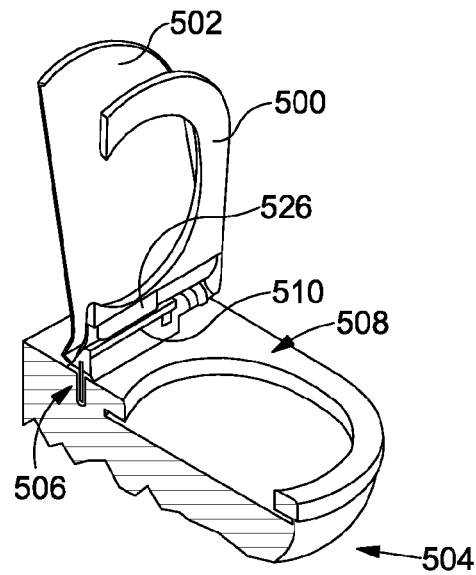

As the lever 403 moves the pin 412 from the relatively lowered position to the relatively raised position within the sleeve 406, this causes nut 430 to also move with the support member within the sleeve towards the body section 404, thereby causing expansion of expandable portion 408 of the sleeve, as shown in FIGS. 9a-9c.

The material from which the sleeve 406 and the expandable portion therein is formed, typically allows a greater degree of expansion of the material in this expandable region on movement of the nut towards the same compared to movement of the nut towards the first end 416 of the sleeve 406.

In addition to the lever 403 being pivotably movable relative to head portion 404 and the pin 412 to allow movement of the pin 412 between the engaged and disengaged positions, lever 403 is rotatable relative to the body section 404 and nut 430 to allow movement of the nut 430 along the length of the pin 412. This allows adjustment of the apparatus 402 so that the engagement means can engage with different sized apertures.

As nut 430 is moved towards the expandable portion 408 relative to the pin 412 during the rotation, this causes the expandable portion 408 to expand even when the lever 403 is in the disengaged position. When the lever 403 moves to the engaged position, this causes even greater expansion of the expandable portion 408, thereby allowing the expandable portion 408 to engage with a larger diameter aperture than previously. The reverse process can happen to allow the apparatus to fit into a smaller diameter aperture.

Referring to FIG. 13a-15b, there is illustrated an embodiment of the present invention in which the length of the sleeve of the retaining pin, or engagement apparatus, 600 can be adjusted, thereby allowing the apparatus to fit securely in different depths or heights of apertures, such as those defined in a toilet pan. The length of the sleeve 406 is adjusted in a direction parallel to the longitudinal axis of the sleeve 406. Similar features described in previous embodiments will be referred to by the same reference numerals.

The retaining pin 600 comprises a toilet seat housing 602 and a user actuation mechanism in the form of a lever 403 is provided. The housing 602 has an aperture 606 defined therein and the internal walls of the housing 602 defining the aperture 606 have a screw thread 607 to allow height adjustment of the body section 620 relative to the housing 602.

The sleeve 406 comprises a first section 431 on a first side of an expandable section 408 and a second section 430 on a second side of the expandable section 408. The sleeve is arranged coaxially about a pin 608 with internal threads of the second section 430 engaging with external threads of the pin 608. The body section 620 has an aperture passing therethrough and the first section 431 of the sleeve 406 engages external threads on the body section 620. The pin 608 extends through the aperture of the body section 620.

The pin 608 is pivotably mounted to lever 403 via a pivot pin 426 which passes through an aperture 615 at a first end 614 of pin 608. The pin 608 is of such length to pass through the aperture 606 in the housing 602 and through the aperture in the body section 620, such that a second end 616 of pin 608 protrudes below and outwardly of body section 620. The expandable portion 408 of the sleeve 406 is positioned coaxially on pin 608 and is able to slide axially along the pin 608. The first section 431 and the second section 430 form two limiting means in the form of a nut 430 mountable to pin member 608 below the expandable portion 408, and a fixed insert 431 mounted to body section 620.

A screw thread 618 is provided on the external surface of pin 608, at least adjacent second end 616 thereof.

A screw thread is provided on an external surface of body section 620 which is complementary to the screw thread 607 provided on the internal surface of housing 602 defining aperture 606, thereby allowing threading engagement of the body section 620 to the housing 602. Rotation of body section 620 relative to housing 602 allows adjustment of the axial position of the body section and sleeve 406 relative to housing 602. Since expandable portion 408 is always provided in abutment with fixed insert 431, this also allows adjustment of the height of the expandable portion 408 with respect to the housing 602, thereby allowing the engagement apparatus 600 to fit toilet pan apertures of different height/depth.

Adjustable nut 430 engaged to the external screw thread 618 of the pin 608 is adjusted relative to expandable portion 408 to ensure that the expandable portion 408 is always sandwiched between insert 431 and nut 430. Adjustment of adjustable nut 430 relative to the expandable portion 408 also changes the degree of expansion of the expandable portion 408 to allow the expandable portion to fit different widths of aperture as previously described.

Figure 13A:
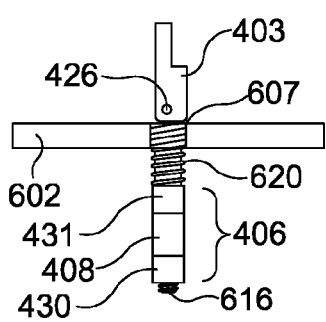
FIGS. 13a and 13b show engagement apparatus according to an embodiment of the present invention in a disengaged position and an engaged position respectively, with the length of the support member provided in a longest adjusted position.
Figure 13B:
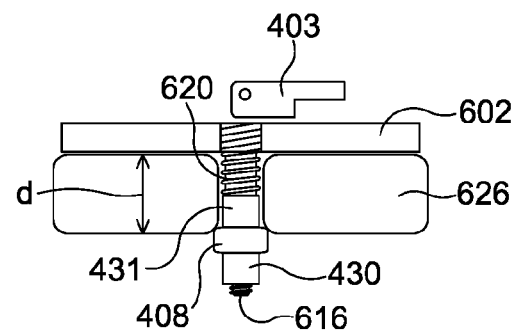

FIG. 13a shows the position of the sleeve 406 adjusted to the maximum length, with sleeve body section 620 protruding from the lower surface of housing 602 by the longest length and placing insert 431 in a furthermost position with respect to housing 602. In this position, the nut 430 and expandable portion 408 are moved towards the second end 616 of the pin 608 to sandwich the expandable portion 408 in between insert 431 and nut 430. This allows the engagement apparatus to be used to engage to a toilet pan 626 having an aperture 224 with a relatively large depth 'd', as shown in FIG. 13b. FIG. 13a shows the engagement apparatus in a disengaged position with respect to the toilet pan 222, and FIG. 13b shows the engagement apparatus in an engaged position on the toilet pan 222.

Figure 14A:
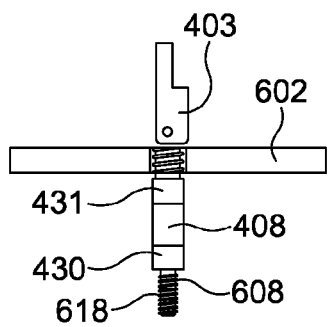
FIGS. 14a and 14b show the suction apparatus in FIGS. 13a and 13b respectively in a shortest adjusted position.
Figure 14B:
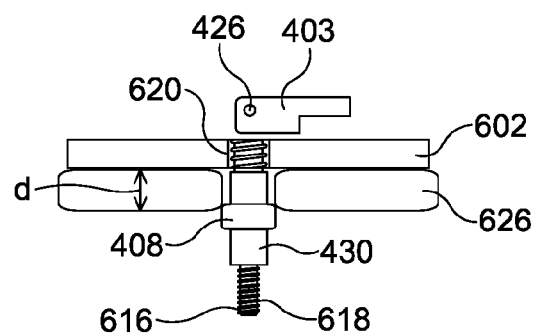
Figure 15A:
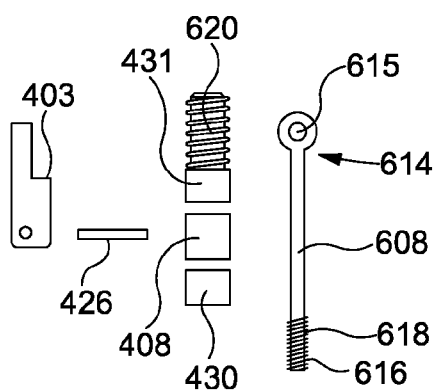
FIG. 15a shows the separate components forming the length adjustment mechanism of the engagement apparatus in FIG. 13a-14b.
Figure 15B:
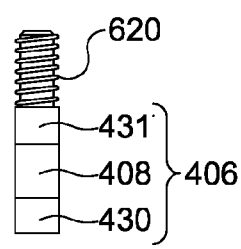
FIG. 15b shows some of the components in FIG. 15a in their assembled relationship with each other in use.

FIG. 14a shows the position of the sleeve 406 adjusted to the minimum length, with the body section 620 protruding from the lower surface of housing 602 by the shortest length and placing insert 431 in a closest position with respect to housing 602. In this position, the body section 620 has a greater number of screw threads 620 engaged with the housing screw threads 607 compared to the maximum length position described above. The nut 430 and expandable portion 408 are moved towards the first end 614 of the pin 608 to sandwich the expandable portion 430 between the insert 431 and nut 430. This allows the retaining pin to be used to engage to a toilet pan 222 having an aperture 224 with a relatively small depth 'd', as shown in FIG. 14b. FIG. 14a shows the retaining pin in a disengaged position with respect to the toilet pan 626 and FIG. 14b shows the engagement apparatus in an engaged position on the toilet pan 626.

It will be appreciated that the position of the expandable portion can be adjusted to ensure it has a relatively large surface area in engaging contact with the surface to which the apparatus is to be attached to in use. For example, in some embodiments the expandable portion is at least partially or wholly located in the aperture defined in the toilet pan. In some embodiments, at least part of the expandable portion engages against a lower surface of the toilet pan. In some embodiments the expandable portion partially engages in the aperture and partially engages against a lower surface of the toilet pan.

Referring to FIG. 11a-12g, there is illustrated an embodiment of the engagement apparatus of the present invention used to fit a toilet seat 500 and lid 502 to attachment apertures defined in a toilet bowl 504. In this embodiment the toilet seat 500 acts as the lever for actuating the engagement apparatus to move the same between the disengaged position and the engaged position.

The engagement apparatus is provided as a single unit, including the toilet seat and lid, with two spaced apart sleeves 506.

In the start position, each sleeve 506 is inserted into the apertures defined towards the rear of the upper surface 508 of toilet bowl 504. A lower surface of body portion 510 of the toilet seat sits on the upper surface 508 of the toilet bowl 504 and extends between the two apertures. The toilet seat and lid are hingedly mounted to the body portion 510 via hinges 512.

Locking means are provided on the body portion 510 to lock the engagement apparatus in a locked position. The locking means includes a lock body 514 which is pivotably mounted on the body portion 510 via pivot pins 516. Each pivot pin sits in elongate slots 518 provided on both sides of the pivot pins 516 to allow smooth pivoting movement of the lock body relative to the body portion 510. The pairs of slots 518 are defined in two spaced apart opposing and upwardly protruding flanges 520 defined in body portion 510.

Two lock buttons 522 are movably mounted in the lock body 514 for movement between a protruding lockable position, wherein the buttons 522 protrude outwardly of body 514 to allow engagement with a lock recess 524 defined in a lock housing 526 provided on the lower surface of toilet seat 500, that is, the surface facing the toilet bowl upper surface when in a closed position, and a recessed unlocked position, wherein the buttons 522 are relatively recessed within body 514 and do not engage in lock recess 524 of lock housing 526.

It is to be noted that the buttons 522 are resiliently biased to the locked position in use via resilient biasing means, such as for example via a spring.

In the start position, as shown in FIG. 11a-11d, the lock body 514 is parallel to the toilet seat 500 and lid 502. The buttons 522 are engaged in the lock recess 524 or lock housing 526.

Figure 12A:
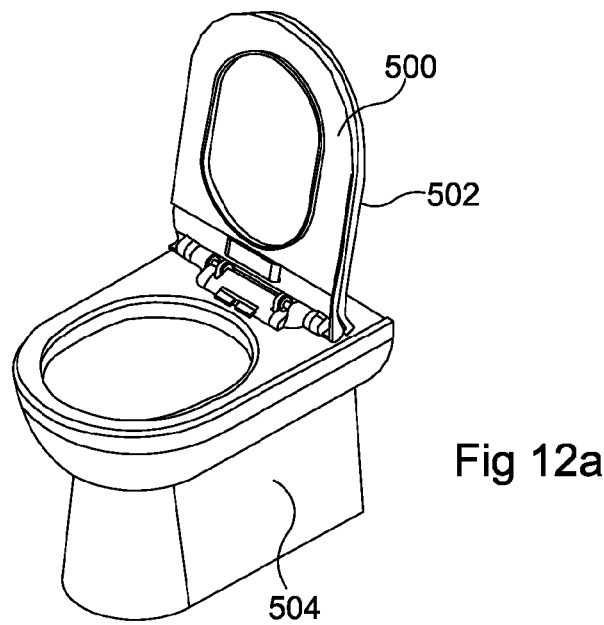
FIG. 12a shows a perspective view of the toilet bowl, toilet seat and lid with the engagement apparatus in FIG. 11a-11d with the lock buttons of the locking mechanism visible.
Figure 12B:
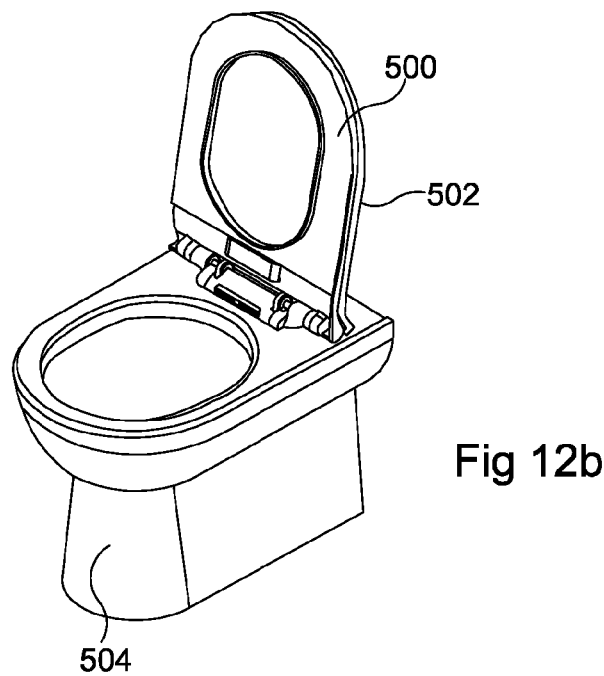
FIG. 12b shows a perspective view of the toilet arrangement in FIG. 12a with the lock buttons of the locking mechanism recessed in a second fitting position.
Figure 12C:
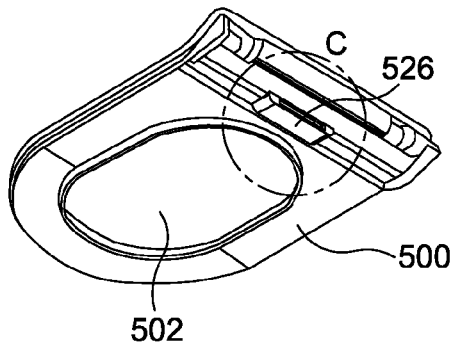
FIG. 12c is a perspective view of the underside of the toilet seat and lid showing the lock recess defined on the lower surface of the toilet seat.
Figure 12D:
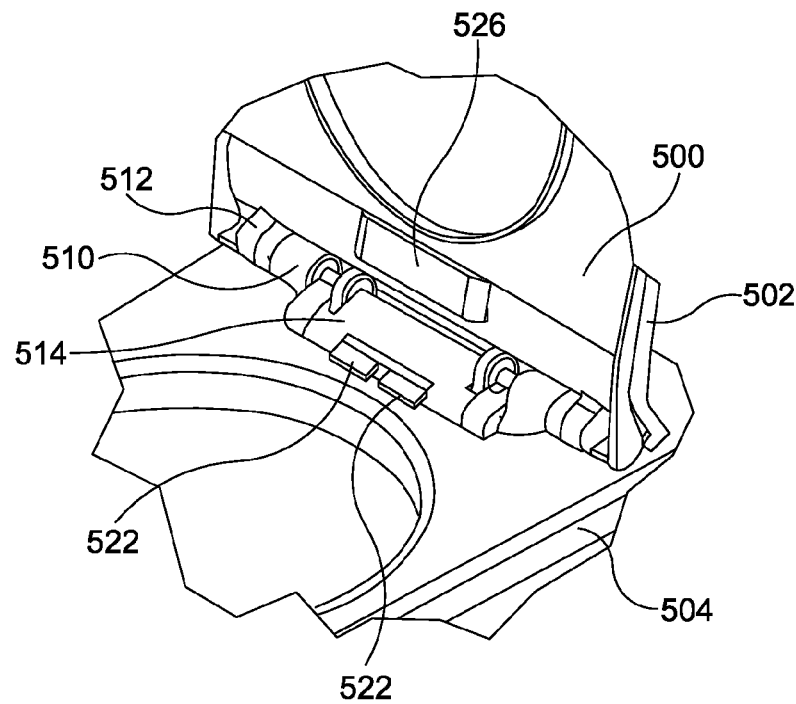
Figure 12E:
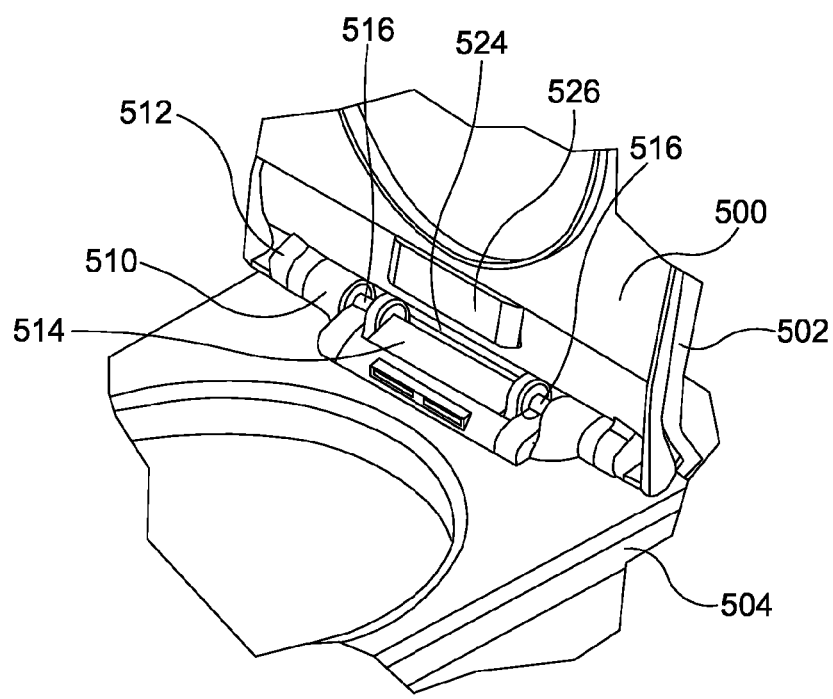
FIG. 12e is an enlarged view of the circular section in FIG. 12b.
Figure 12F:
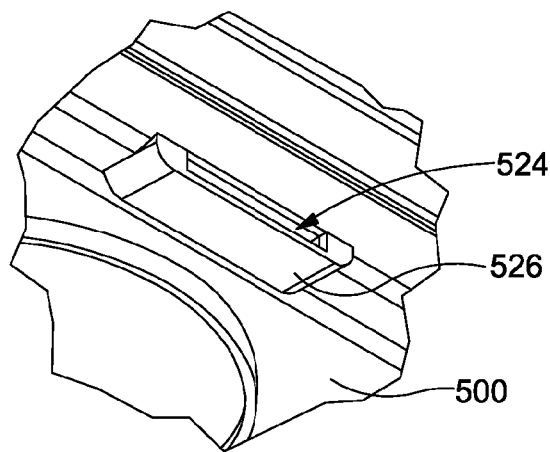
FIG. 12f is an enlarged view of the circular section in FIG. 12c.
Figure 12G:
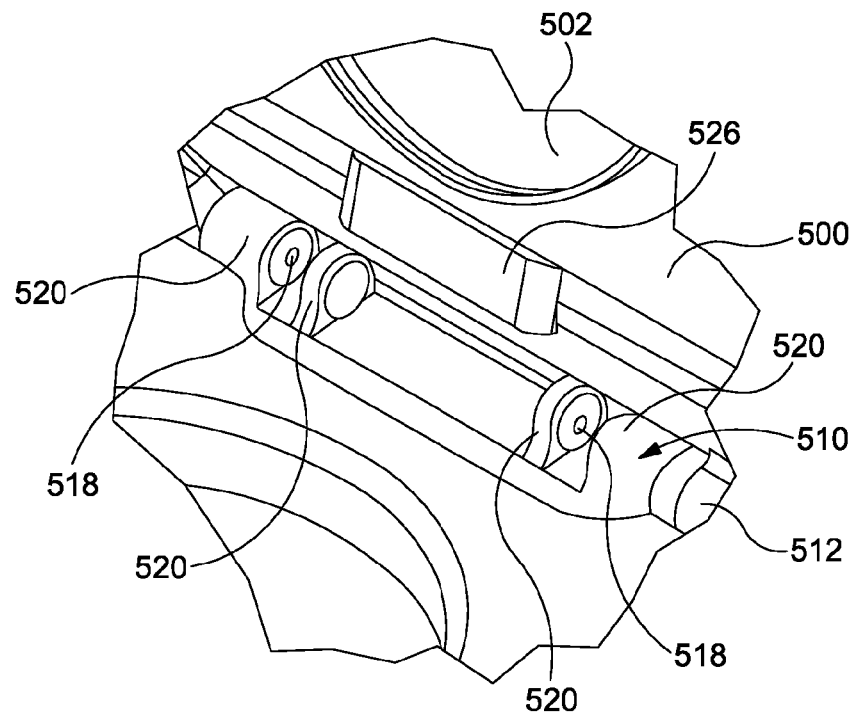
FIG. 12g is an enlarged view of the engagement apparatus with the locking mechanism removed.

In order to move the sleeve from the disengaged position to the engaged position, the toilet seat 500 is lowered towards the upper surface 508 of toilet bowl 504 until it engages with the same. The toilet seat 500 acts as a lever to expand the expandable portion of the sleeve 506, thereby engaging the same in the apertures in the toilet bowl. As the toilet seat 500 is lowered, this disengages the lock buttons 522 from the lock recess and moves the lock to an unlocked position, thereby moving the lock body 514 to a position where it is now parallel to the upper surface 508 of toilet bowl 04, as shown in FIGS. 12b and 12e.

The toilet lid 502 is then lowered towards the upper surface 508 of the toilet bowl and the toilet seat 500. As it does so, the toilet seat lid 502 engages with an actuating portion 524 at the rear of the lock body 514, thereby moving the lock buttons 522 from the unlocked position to the locked position where they engage in lock recess 524 in housing 526. With the lock buttons in the lock recess in a locked position, this maintains the sleeve 506 in the engaged position, such that further movement of the toilet seat and lid between raised and lowered positions has no effect on the engaged position of the sleeve 506.

When a user wishes to remove the toilet seat and lid from the toilet bowl, a user manually presses on the actuating portion 524 of lock body 514, to unlock the lock means and move buttons 522 out of engagement with lock recess 524 and lifts the whole apparatus as a single unit from the toilet bowl 504.

A textured surface can be provided on the surface of buttons 522 to provide surface friction.

The invention claimed is:

1. A retaining pin comprising:
   a body section having an aperture therein;
   an actuation mechanism arranged at a first end of the body section;
   a pin, connected at a first end to the actuation mechanism and extending therefrom, through the aperture of the body section; and
   an outer sleeve arranged around the pin in contact therewith;
   wherein the outer sleeve comprises:
      a first section that engages the body section;
      a second section comprising an expandable material; and
      a third section that engages the pin;
   wherein actuation of the actuation mechanism moves the distal end of the pin and the third section axially towards the body section to compress the second section, thereby causing it to expand radially from a first dimension to a second dimension;
   wherein the position of the first section on the body section is axially adjustable to vary the distance between the first section and the actuating mechanism; and
   wherein the position of the third section is axially adjustable on the pin to vary the distance between the third section and the first section.

2. The retaining pin according to claim 1, wherein the body section comprises an external threaded section along at least part of its length and the first section comprises a corresponding thread to engage the threaded section on the pin.

3. The retaining pin according to an claim 1, wherein the pin comprises an external threaded section along at least part of its length and the third section comprises a corresponding thread to engage the threaded section on the pin.

4. The retaining pin according to claim 1, wherein the expandable section comprises an elastomeric material that expands radially when compressed.

5. The retaining pin according to claim 1, wherein the actuation mechanism comprises a cam to move the end of the pin distal from the actuation mechanism axially within the body section, thereby compressing the elastomeric material.

6. A toilet seat arrangement comprising a toilet seat having a body portion and a retaining pin according to claim 1 connected thereto.

7. The toilet seat arrangement according to claim 6, wherein an aperture in the body portion of the toilet seat comprises a threaded inner surface and the body section of the retaining pin comprises corresponding threaded section and the respective threaded sections engage.

8. A toilet seat system including the toilet seat arrangement according to claim 6 and a toilet pan having a biscuit with at least one aperture therein, wherein the retaining pin passes through the at least one aperture in the toilet pan biscuit and, when the actuation mechanism is operated, the expandable section expands to a size larger than the aperture in the toilet pan biscuit, thereby retaining the seat on the pan.

\* \* \* \* \*